(12) United States Patent
Komatsu et al.

(10) Patent No.: US 10,493,975 B2
(45) Date of Patent: Dec. 3, 2019

(54) BICYCLE ELECTRIC SYSTEM

(71) Applicant: SHIMANO INC., Sakai (JP)

(72) Inventors: Atsushi Komatsu, Sakai (JP); Yuta Kurokawa, Sakai (JP); Shingo Sakurai, Sakai (JP)

(73) Assignee: SHIMANO INC., Sakai (JP)

( * ) Notice: Subject to any disclaimer, the term of this patent is extended or adjusted under 35 U.S.C. 154(b) by 145 days.

(21) Appl. No.: 15/642,265

(22) Filed: Jul. 5, 2017

(65) Prior Publication Data

US 2019/0009771 A1 Jan. 10, 2019

(51) Int. Cl.

| B60W 10/22 | (2006.01) |
| B60W 10/11 | (2012.01) |
| B62K 25/04 | (2006.01) |
| B62J 1/08 | (2006.01) |
| B62M 6/45 | (2010.01) |
| B62M 9/122 | (2010.01) |
| B62M 9/123 | (2010.01) |
| B62M 25/08 | (2006.01) |
| B62J 99/00 | (2009.01) |
| B60R 16/03 | (2006.01) |
| B62K 23/02 | (2006.01) |

(52) U.S. Cl.
CPC .......... *B60W 10/11* (2013.01); *B60W 10/22* (2013.01); *B62J 1/08* (2013.01); *B62K 25/04* (2013.01); *B62M 6/45* (2013.01); *B62M 9/122* (2013.01); *B62M 9/123* (2013.01); *B60R 16/03* (2013.01); *B60W 2510/1025* (2013.01); *B60W 2520/10* (2013.01); *B60W 2710/1005* (2013.01); *B60W 2710/223* (2013.01); *B62J 2001/085* (2013.01); *B62J 2099/002* (2013.01); *B62J 2099/004* (2013.01); *B62K 23/02* (2013.01); *B62K 2025/047* (2013.01); *B62K 2207/00* (2013.01); *B62M 25/08* (2013.01)

(58) Field of Classification Search
CPC .......... B60W 10/11; B60W 10/22; B62J 1/08; B62K 25/04; B62M 25/08
USPC .......................................................... 701/37
See application file for complete search history.

(56) References Cited

U.S. PATENT DOCUMENTS

| 7,760,078 | B2* | 7/2010 | Miki | ...................... B62M 25/08 340/432 |
| 8,286,982 | B2 | 10/2012 | Plantet et al. | |
| 2010/0276906 | A1* | 11/2010 | Galasso | ................. B60G 15/12 280/283 |
| 2015/0120119 | A1 | 4/2015 | Tauchi et al. | |
| 2019/0009771 | A1* | 1/2019 | Komatsu | ................ B60W 10/11 |

* cited by examiner

*Primary Examiner* — Thomas G Black
*Assistant Examiner* — Wae L Louie
(74) *Attorney, Agent, or Firm* — Mori & Ward, LLP

(57) ABSTRACT

A bicycle electric system comprises a first electric component, a second electric component, and a second controller. The first electric component includes a first controller and a sensor. The first controller is configured to control an operating status of the first electric component based on an output of the sensor. The second electric component is different from the first electric component. At least one of the first electric component and the second electric component includes an electric suspension. The second controller is configured to control an operating status of the second electric component based on the output of the sensor of the first electric component.

19 Claims, 10 Drawing Sheets

BICYCLE ELECTRIC SYSTEM

BACKGROUND OF THE INVENTION

Field of the Invention

The present invention relates to a bicycle electric system.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an electric system.

SUMMARY OF THE INVENTION

In accordance with a first aspect of the present invention, a bicycle electric system comprises a first electric component, a second electric component, and a second controller. The first electric component includes a first controller and a sensor. The first controller is configured to control an operating status of the first electric component based on an output of the sensor. The second electric component is different from the first electric component. At least one of the first electric component and the second electric component includes an electric suspension. The second controller is configured to control an operating status of the second electric component based on the output of the sensor of the first electric component.

With the bicycle electric system according to the first aspect, it is possible to reduce a cost of the bicycle electric system by sharing the sensor of the first electric component with the second electric component.

In accordance with a second aspect of the present invention, the bicycle electric system according to the first aspect is configured so that the first electric component includes the electric suspension.

With the bicycle electric system according to the second aspect, it is possible to reduce a cost of the bicycle electric system by sharing the sensor of the electric suspension between the second electric component.

In accordance with a third aspect of the present invention, the bicycle electric system according to the first or second aspect is configured so that the second electric component includes at least one of an electric shifting device and an electric adjustable seatpost.

With the bicycle electric system according to the third aspect, it is possible to reduce a cost of the bicycle electric system by sharing the sensor of the first electric component with the at least one of the electric shifting device and the electric adjustable seatpost.

In accordance with a fourth aspect of the present invention, the bicycle electric system according to any one of the first to third aspects further comprises a power supply electrically connectable to the first electric component and the second electric component to supply electricity to the first electric component and the second electric component.

With the bicycle electric system according to the fourth aspect, it is possible to supply electricity to the first and second electric components using the power supply.

In accordance with a fifth aspect of the present invention, the bicycle electric system according to any one of the first to fourth aspects is configured so that the first electric component includes a first interface configured to communicate using a first communication protocol. The second controller includes a second interface electrically connectable to the second electric component to communicate with the second electric component using a second communication protocol different from the first communication protocol.

With the bicycle electric system according to the fifth aspect, it is possible to improve diversity of the system by using the first and second communication protocols.

In accordance with a sixth aspect of the present invention, the bicycle electric system according to the fifth aspect further comprises a protocol converter electrically connectable to the first electric component and the second controller to convert one of the first communication protocol and the second communication protocol to the other of the first communication protocol and the second communication protocol.

With the bicycle electric system according to the sixth aspect, it is possible to certainly improve diversity of the system by using the first and second communication protocols.

In accordance with a seventh aspect of the present invention, the bicycle electric system according to any one of the first to sixth aspects is configured so that the second controller is electrically connectable to the first electric component with an electric cable to communicate with the first electric component through the electric cable.

With the bicycle electric system according to the seventh aspect, it is possible to certainly communicate between the first controller and the second controller through the electric cable.

In accordance with an eighth aspect of the present invention, the bicycle electric system according to any one of the first to seventh aspects is configured so that the second controller is electrically connectable to the first electric component with a wireless communication path to communicate wirelessly with the first electric component through the wireless communication path.

With the bicycle electric system according to the eighth aspect, it is possible to omit an electric cable from the bicycle electric system, reducing cost of the bicycle electric system.

In accordance with a ninth aspect of the present invention, the bicycle electric system according to any one of the first to eighth aspects is configured so that the sensor includes an acceleration sensor.

With the bicycle electric system according to the ninth aspect, it is possible to control at least one of the first and second electric components in accordance with a landform since acceleration applied to a bicycle from a road indicates roughness of the road.

In accordance with a tenth aspect of the present invention, the bicycle electric system according to the ninth aspect is configured so that the second electric component includes an electric shifting device. The second controller is configured to control the electric shifting device to downshift in a case where the second controller concludes that an output of the acceleration sensor is larger than an acceleration threshold.

With the bicycle electric system according to the tenth aspect, it is possible to set a gear ratio suitable for a running condition of a bicycle.

In accordance with an eleventh aspect of the present invention, the bicycle electric system according to the ninth or tenth aspect is configured so that the second electric component includes an electric shifting device. The second controller is configured to control the electric shifting device to upshift in a case where the second controller concludes that an output of the acceleration sensor is smaller than an acceleration threshold.

With the bicycle electric system according to the eleventh aspect, it is possible to set a gear ratio suitable for a running condition of a bicycle.

In accordance with a twelfth aspect of the present invention, the bicycle electric system according to the ninth aspect is configured so that the second electric component includes an electric adjustable seatpost. The second controller is configured to control the electric adjustable seatpost to shorten the electric adjustable seatpost in a case where the second controller concludes that an output of the acceleration sensor is larger than an acceleration threshold.

With the bicycle electric system according to the twelfth aspect, it is possible to set a seatpost height suitable for a running condition of a bicycle.

In accordance with a thirteenth aspect of the present invention, the bicycle electric system according to the ninth or twelfth aspect is configured so that the second electric component includes an electric adjustable seatpost. The second controller is configured to control the electric adjustable seatpost to lengthen the electric adjustable seatpost in a case where the second controller concludes that an output of the acceleration sensor is smaller than an acceleration threshold.

With the bicycle electric system according to the thirteenth aspect, it is possible to set a seatpost height suitable for a running condition of a bicycle.

In accordance with a fourteenth aspect of the present invention, the bicycle electric system according to any one of the first and fourth to eighth aspects is configured so that the first electric component includes an electric drive unit to generate an auxiliary drive force, the sensor including a torque sensor. The second electric component includes the electric suspension.

With the bicycle electric system according to the fourteenth aspect, it is possible to control the electric suspension in accordance with a pedaling torque.

In accordance with a fifteenth aspect of the present invention, the bicycle electric system according to the fourteenth aspect is configured so that the second electric component includes the electric suspension having an unlocked state and a locked state. The second controller is configured to control the electric suspension to be in the unlocked state in a case where the second controller concludes that an output of the torque sensor is lower than a torque threshold.

With the bicycle electric system according to the fifteenth aspect, it is possible to set a suitable state of the electric suspension for a running condition of a bicycle.

In accordance with a sixteenth aspect of the present invention, the bicycle electric system according to the fourteenth or fifteenth aspect is configured so that the second electric component includes the electric suspension having an unlocked state and a locked state. The second controller is configured to control the electric suspension to be in the locked state in a case where the second controller concludes that an output of the torque sensor is higher than a torque threshold.

With the bicycle electric system according to the sixteenth aspect, it is possible to set a suitable state of the electric suspension for the running condition of the bicycle.

In accordance with a seventeenth aspect of the present invention, a bicycle electric system comprises an electric component and a controller. The electric component is different from an electric suspension. The controller is configured to control an operating status of the electric component based on an output of a sensor of the electric suspension, the electric component includes at least one of an electric shifting device and an electric adjustable seatpost.

With the bicycle electric system according to the seventeenth aspect, it is possible to reduce a cost of the bicycle electric system by sharing the sensor of the electric suspension with the electric component.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
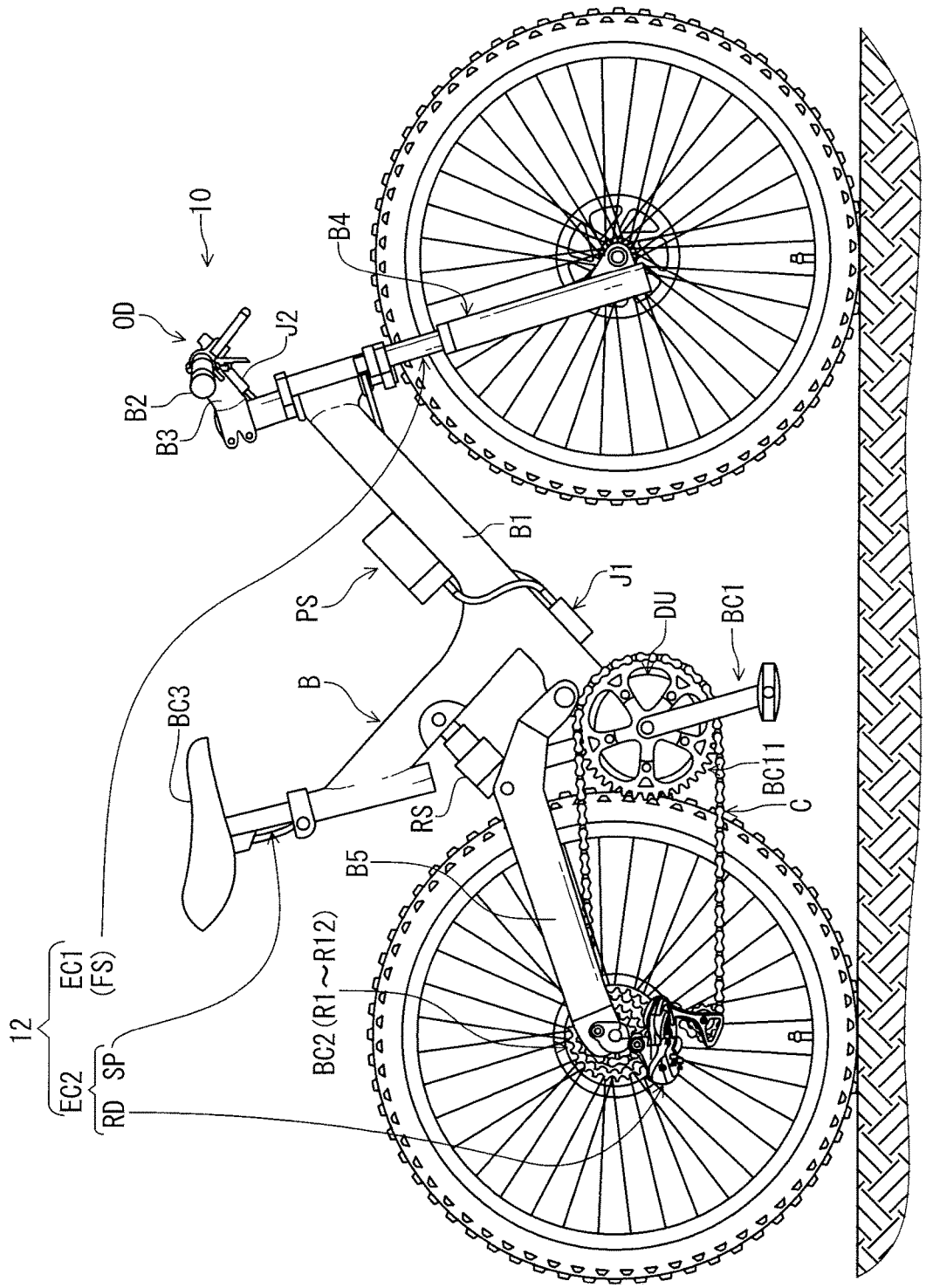
FIG. 1 is a side elevational view of a bicycle provided with a bicycle electric system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle 10 includes a bicycle electric system 12 in accordance with a first embodiment. While the bicycle 10 is illustrated as a mountain bike, the bicycle electric system 12 can be applied to a road bike or any type of bicycle.

The bicycle 10 includes a bicycle body B, a crank assembly BC1, a rear sprocket assembly BC2, a saddle BC3, and a bicycle chain C. The bicycle body B includes a bicycle frame B1, a handlebar B2, a stem B3, a front fork B4, and a rear swing arm B5. The handlebar B2 is coupled to the front fork B4 with the stem B3. The rear swing arm B5 is pivotally coupled to the bicycle frame B1. The bicycle chain C is engaged with a front sprocket BC11 of the crank assembly BC1 and the rear sprocket assembly BC2.

The bicycle 10 includes an electric suspension FS, an electric suspension RS, an electric shifting device RD, and an electric adjustable seatpost SP. The electric suspension FS is mounted to the front fork B4. The electric suspension RS couples the bicycle frame B1 to the rear swing arm B5. The saddle BC3 is attached to the electric adjustable seatpost SP. The electric adjustable seatpost SP is mounted to the bicycle body B to change a position of the saddle BC3 relative to the bicycle body B.

The rear sprocket assembly BC2 includes twelve sprockets R1 to R12 corresponding to twelve speed stages. The electric shifting device RD shifts the bicycle chain C relative to the rear sprocket assembly BC2 to change a speed stage. In this embodiment, the front sprocket BC11 is a single (solitary) sprocket in the crank assembly BC1. However, the crank assembly BC1 can include a plurality of front sprockets. In such an embodiment, the bicycle 10 includes a front derailleur configured to shift the bicycle chain C relative to the plurality of front sprockets.

The bicycle 10 includes a power supply PS and an electric drive unit DU. The power supply PS is mounted to the bicycle body B to supply electricity to other electric components. The electric drive unit DU is mounted to the bicycle body B to assist pedaling. The electric drive unit DU is configured to generate an auxiliary drive force in accordance with a pedaling torque. The electric drive unit DU is coupled to the crank assembly BC1 to transmit the auxiliary drive force to the crank assembly BC1. The electric drive unit DU can be omitted from the bicycle electric system 12.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle BC3 with facing the handlebar B2. Accordingly, these terms, as utilized to describe the bicycle electric system 12, should be interpreted relative to the bicycle 10 equipped with the bicycle electric system 12 as used in an upright riding position on a horizontal surface.

Figure 2:
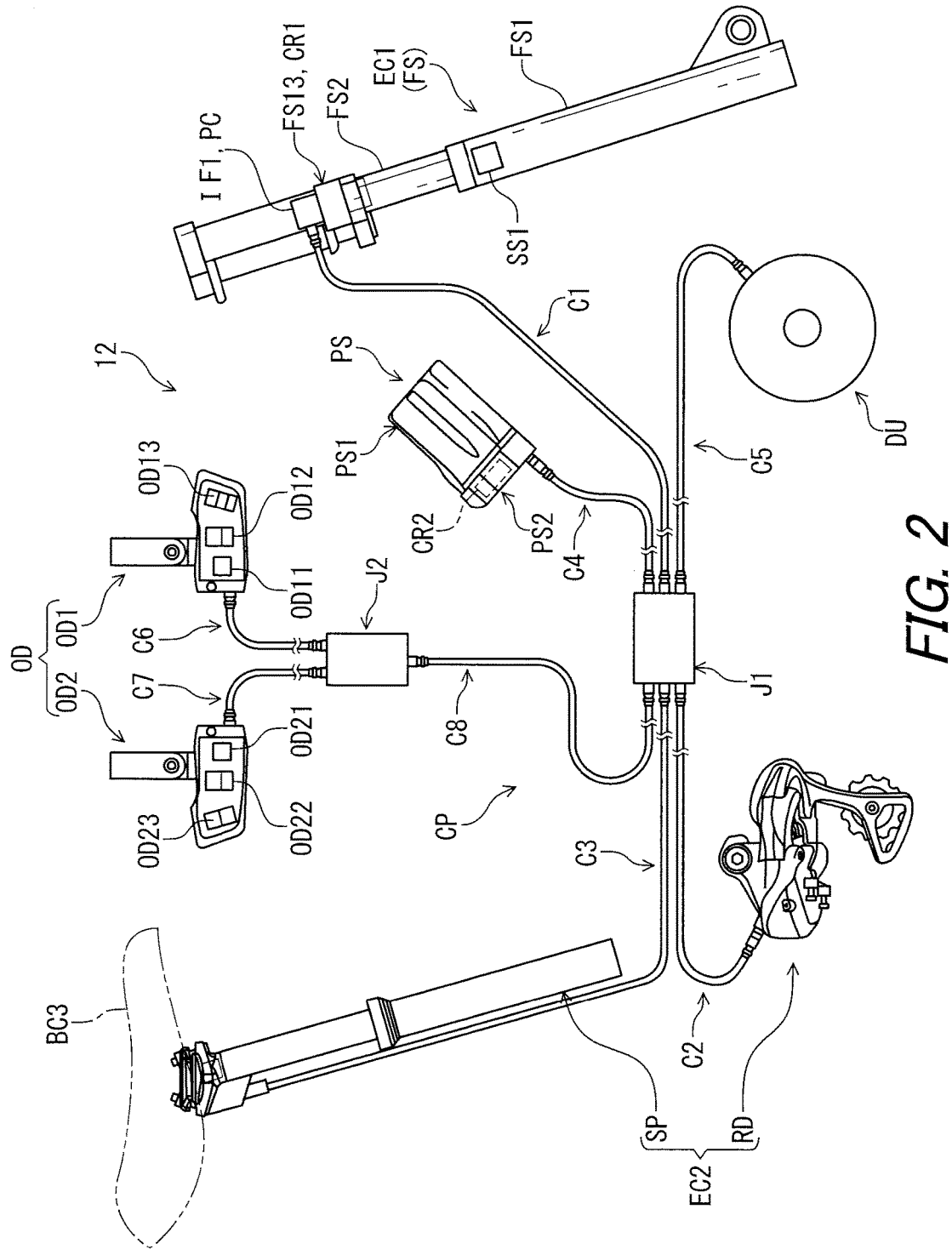
FIG. 2 is a schematic diagram of the bicycle electric system illustrated in FIG. 1.

As seen in FIG. 2, the bicycle electric system 12 comprises a first electric component EC1 and a second electric component EC2. The second electric component EC2 can also referred to as an electric component EC2. Thus, the bicycle electric system 12 comprises the electric component EC2.

The second electric component EC2 is different from the first electric component EC1. The second electric component EC2 is separately provided from the first electric component EC1. At least one of the first electric component EC1 and the second electric component EC2 includes the electric suspension FS. In this embodiment, the first electric component EC1 includes the electric suspension FS. The second electric component (the electric component) EC2 includes at least one of the electric shifting device RD and the electric adjustable seatpost SP. The second electric component EC2 includes the electric shifting device RD. Furthermore, the second electric component EC2 includes the electric adjustable seatpost SP. Namely, the electric component EC2 is different from the electric suspension FS. The electric component EC2 is separately provided from the electric suspension FS. However, the second electric component EC2 can include only one of the electric shifting device RD and the electric adjustable seatpost SP. The second electric component EC2 can include another device instead of or in addition to the at least one of the electric shifting device RD and the electric adjustable seatpost SP. The first electric component EC1 can include another device instead of or in addition to the electric suspension FS.

In this embodiment, the bicycle electric system 12 comprises an electric communication path CP. The electric communication path CP operatively connects electric components to each other. For example, the electric communication path CP includes electric cables C1 to C8 and electric junctions J1 and J2. However, the electric communication path CP can at least partly include a wireless communication path.

The first electric component EC1 is connected to the electric junction J1 with the electric cable C1. The electric shifting device RD of the second electric component EC2 is connected to the electric junction J1 with the electric cable C2. The electric adjustable seatpost SP is connected to the electric junction J1 with electric cable C3.

The bicycle electric system 12 further comprises the power supply PS. The power supply PS is electrically connectable to the first electric component EC1 and the second electric component EC2 to supply electricity to the first electric component EC1 and the second electric component EC2. The power supply PS is electrically connected to the first electric component EC1 and the second electric component EC2 with the electric communication path CP. The power supply PS includes a battery PS1 and a battery holder PS2. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the first electric component EC1, the second electric component EC2, and other electric components.

The battery holder PS2 is mounted to the bicycle body B (FIG. 1) and is electrically connected to the first electric component EC1 and the second electric component EC2. In this embodiment, the battery holder PS2 is connected to the electric junction J1 with the electric cable C4. The electric drive unit DU is connected to the electric junction J1 with the electric cable C5. Thus, the power supply PS is electrically connected to the first electric component EC1, the second electric component EC2, and the electric drive unit DU with the electric cables C1 to C5 and the electric junction J1. The battery holder PS2 includes a voltage controller PS21 configured to control a voltage of electricity supplied from the battery PS1.

As seen in FIG. 2, the bicycle electric system 12 further comprises a bicycle operating device OD. The bicycle operating device OD is mounted to the handlebar B2 (FIG. 1). In this embodiment, the bicycle operating device OD is configured to receive a user input to operate the first electric component EC1, the second electric component EC2, and the electric drive unit DU.

The bicycle operating device OD include a first operating device OD1 and a second operating device OD2. The first operating device OD1 and the second operating device OD2 are mounted to the handlebar B2 (FIG. 1). The first operating device OD1 is a right-hand control device. The second operating device OD2 is a left-hand control device. However, the bicycle operating device OD can include another operating device instead of or in addition to the first operating device OD1 and the second operating device OD2. One of the first operating device OD1 and the second operating device OD2 can be omitted from the bicycle operating device OD.

The electric communication path CP electrically connects the first electric component EC1, the second electric component EC2, the electric drive unit DU, the power supply PS, and the bicycle operating device OD to each other. In this embodiment, the first operating device OD1 is connected to the electric junction J2 with the electric cable C6. The second operating device OD2 is electrically connected to the electric junction J2 with the electric cable C7. The electric junction J1 is electrically connected to the electric junction J2 via the electric cable C8. Thus, the bicycle operating device OD is connected to the first electric component EC1, the second electric component EC2, the power supply PS, and the electric drive unit DU.

Figure 3:
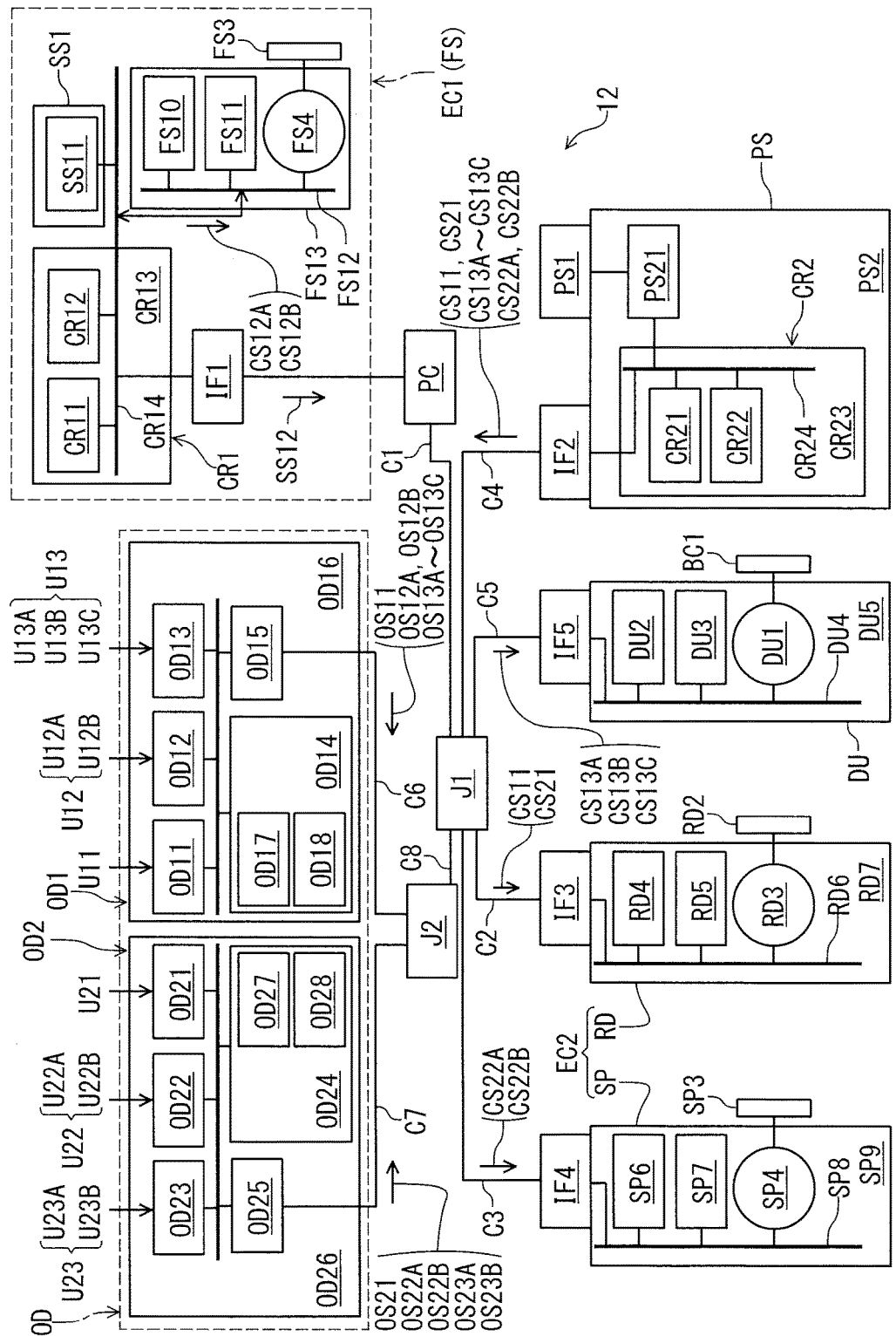
FIG. 3 is a block diagram of the bicycle electric system illustrated in FIG. 1.

As seen in FIG. 3, the first operating device OD1 is configured to receive an upshift user input U11 from the user. The second operating device OD2 is configured to receive a downshift user input U21 from the user. The first operating device OD1 is configured to generate an upshift operation signal OS11 in response to the upshift user input U11. The second operating device OD2 is configured to generate a downshift operation signal OS21 in response to the downshift user input U21.

The first operating device OD1 is configured to receive an unlock user input U12A and a lock user input U12B. The first operating device OD1 is configured to generate an unlock operation signal OS12A in response to the unlock user input U12A. The first operating device OD1 is configured to generate a lock operation signal OS12B in response to the lock user input U12B. The electric suspension FS has an unlocked state and a locked state and changes a state between the unlocked state and the locked state based on the unlock operation signal OS12A and the lock operation signal OS12B.

The first operating device OD1 is configured to receive an assist user input U13. The assist user input U13 includes a first-mode user input U13A, a second-mode user input U13B, and a third-mode user input U13C. The first operating device OD1 is configured to generate a first-mode operation signal OS13A in response to the first-mode user input U13A. The first operating device OD1 is configured to generate a second-mode operation signal OS13B in response to the second-mode user input U13B. The first operating device OD1 is configured to generate a third-mode operation signal OS13C in response to the third-mode user input U13C.

The second operating device OD2 is configured to receive a seatpost user input U22. The seatpost user input U22 includes a first seatpost user input U22A and a second seatpost user input U22B. The second operating device OD2 is configured to generate a first seatpost operation signal OS22A in response to the first seatpost user input U22A. The second operating device OD2 is configured to generate a second seatpost operation signal OS22B in response to the second seatpost user input U22B. The electric adjustable seatpost SP lengthens an overall length based on the first seatpost operation signal OS22A. The electric adjustable seatpost SP shortens the overall length based on the second seatpost operation signal OS22B.

The second operating device OD2 is configured to receive a mode user input U23. The mode user input U23 includes a manual-mode user input U23A and an automatic user input U23B. The second operating device OD2 is configured to generate a manual-mode operation signal OS23A in response to the manual-mode user input U23A. The second operating device OD2 is configured to generate an automatic-mode operation signal OS23B in response to the automatic-mode user input U23B.

As seen in FIG. 3, the first operating device OD1 includes an upshift switch OD11, a lock operation switch OD12, an assist operation switch OD13, a first operation controller OD14, a first operation interface OD15, and a first circuit board OD16. The upshift switch OD11, the lock operation switch OD12, the assist operation switch OD13, the first operation controller OD14, and the first operation interface OD15 are electrically mounted on the first circuit board OD16. The upshift switch OD11 is configured to receive the upshift user input U11 from the user. The lock operation switch OD12 is configured to receive the unlock user input U12A and the lock user input U12B from the user. The assist operation switch OD13 is configured to receive the assist user input U13 from the user. For example, the upshift switch OD11 includes a push-button switch. The lock operation switch OD12 includes two-position switch having two positions corresponding to the unlock user input U12A and the lock user input U12B. The assist operation switch OD13 includes a three-position switch having three positions corresponding to the first-mode to third-mode user input U13A to U13C.

The first operation controller OD14 is electrically connected to the upshift switch OD11 to generate the upshift operation signal OS11 in response to the upshift user input U11 received by the upshift switch OD11. The first operation controller OD14 is electrically connected to the lock operation switch OD12 to generate the unlock operation signal OS12A in response to the unlock user input U12A received by the lock operation switch OD12. The first operation controller OD14 is electrically connected to the lock operation switch OD12 to generate the lock operation signal OS12B in response to the lock user input U12B received by the lock operation switch OD12.

The first operation controller OD14 is electrically connected to the assist operation switch OD13 to generate the first-mode operation signal OS13A in response to the first-mode user inputs U13A received by the assist operation switch OD13. The first operation controller OD14 is electrically connected to the assist operation switch OD13 to generate the second-mode operation signal OS13B in response to the second-mode user inputs U13B received by the assist operation switch OD13. The first operation controller OD14 is electrically connected to the assist operation switch OD13 to generate the third-mode operation signal OS13C in response to the third-mode user inputs U13C received by the assist operation switch OD13.

In this embodiment, the first operation controller OD14 includes a processor OD17 and a memory OD18. The processor OD17 and the memory OD18 are electrically mounted on the first circuit board OD16. The processor OD17 includes a central processing unit (CPU) and a memory controller. The memory OD18 is electrically connected to the processor OD17. The memory OD18 includes a read only memory (ROM) and a random-access memory (RAM). The ROM includes a non-transitory computer-readable storage medium. The RAM includes a transitory computer-readable storage medium. The memory OD18 includes storage areas each having an address in the ROM and the RAM. The processor OD17 controls the memory OD18 to store data in the storage areas of the memory OD18 and reads data from the storage areas of the memory OD18. The memory OD18 (e.g., the ROM) stores a program. The program is read into the processor OD17, and thereby functions of the first operation controller OD14 is performed.

The memory OD18 stores identification information ID11 of the first operating device OD1. The identification information ID11 of the first operating device OD1 includes a unique device identification (ID) (e.g., a value indicative of a shifter) of the first operating device OD1. The identification information ID11 of the first operating device OD1 further includes a value indicative of a device type such as "right-hand side" or "left-hand side."

The first operation interface OD15 is electrically connected to the first operation controller OD14 to output the upshift operation signal OS11, the unlock operation signal OS12A, the lock operation signal OS12B, and the first-mode to third-mode operation signals OS13A to OS13C to other electric components.

As seen in FIG. 3, the second operating device OD2 includes a downshift switch OD21, a seatpost operation switch OD22, a control mode switch OD23, a second operation controller OD24, a second operation interface OD25, and a second circuit board OD26. The downshift switch OD21, the seatpost operation switch OD22, the control mode switch OD23, the second operation controller OD24, and the second operation interface OD25 are electrically mounted on the second circuit board OD26. The downshift switch OD21 is configured to receive the downshift user input U21 from the user. The seatpost operation switch OD22 is configured to receive the seatpost user input U22 from the user. The control mode switch OD23 is configured to receive the mode user input U23 from the user. For example, the downshift switch OD21 includes a push-button switch. The seatpost operation switch OD22 includes push-button switches corresponding to the first and second seatpost user inputs U22A and U22B. The control mode switch OD23 includes two-position switch having two positions corresponding to the manual-mode and automatic-mode user inputs U23A and U23B.

The second operation controller OD24 is electrically connected to the downshift switch OD21 to generate the downshift operation signal OS21 in response to the downshift user input U21 received by the downshift switch OD21. The second operation controller OD24 is electrically connected to the seatpost operation switch OD22 to generate the seatpost operation signal OS22 in response to the seatpost user input U22 received by the seatpost operation switch OD22. The second operation interface OD25 is electrically connected to the second operation controller OD24 to output the downshift operation signal OS21 and the seatpost operation signal OS22.

In this embodiment, the second operation controller OD24 includes a processor OD27 and a memory OD28. The processor OD27 and the memory OD28 are electrically mounted on the second circuit board OD26. The processor OD27 includes a CPU and a memory controller. The memory OD28 is electrically connected to the processor OD27. The memory OD28 includes a ROM and a RAM. The ROM includes a non-transitory computer-readable storage medium. The RAM includes a transitory computer-readable storage medium. The memory OD28 includes storage areas each having an address in the ROM and the RAM. The processor OD27 controls the memory OD28 to store data in the storage areas of the memory OD28 and reads data from the storage areas of the memory OD28. The memory OD28 (e.g., the ROM) stores a program. The program is read into the processor OD27, and thereby functions of the second operation controller OD24 is performed.

The second operation interface OD25 is electrically connected to the second operation controller OD24 to output the downshift operation signal OS21 and the seatpost operation signal OS22 to other electric components.

Figure 4:
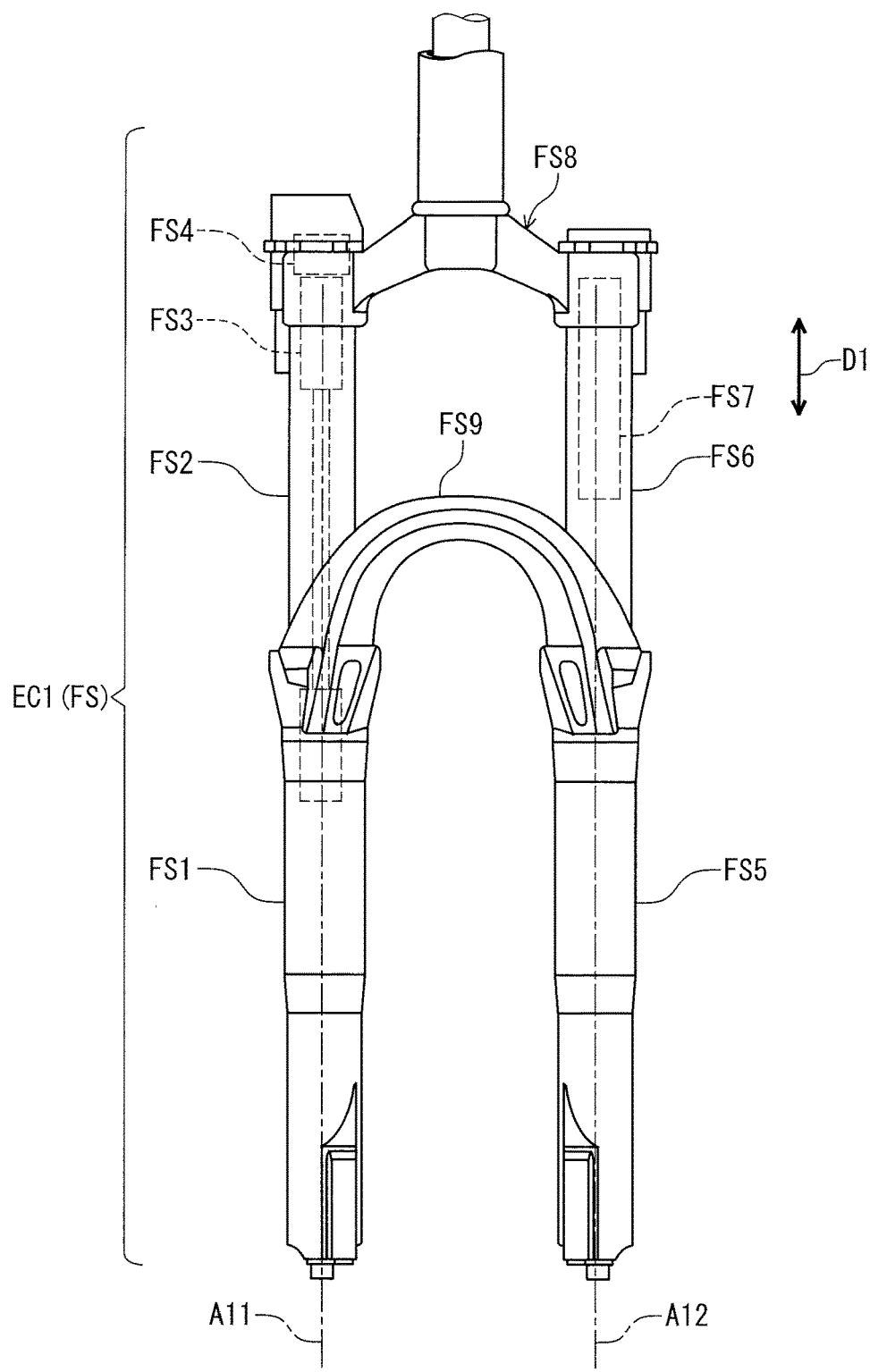
FIG. 4 is a front view of an electric suspension of the bicycle electric system illustrated in FIG. 1.

As seen in FIG. 4, the electric suspension FS comprises a first suspension tube FS1, a second suspension tube FS2, a valve structure FS3, and a first electric actuator FS4. The first suspension tube FS1 has a center axis A11. The second suspension tube FS2 is telescopically received in the first suspension tube FS1. The valve structure FS3 is configured to change the damping characteristic of the electric suspension FS. The first electric actuator FS4 is coupled to the valve structure FS3 to actuate the valve structure FS3. The first electric actuator FS4 is mounted on an upper end of the second suspension tube FS2. However, the first electric actuator FS4 can be provided at other positions.

In this embodiment, the electric suspension FS has the unlocked state and the locked state. The valve structure FS3 at least changes a state of the electric suspension FS between the unlocked state and the locked state. In the locked state of the valve structure FS3, the first suspension tube FS1 is locked relative to the second suspension tube FS2 in the telescopic direction D1. For example, a fluid passageway (not shown) of the valve structure FS3 is closed by a valve (not shown) of the valve structure FS3 in the locked state. In the unlocked state of the valve structure FS3, the first suspension tube FS1 and the second suspension tube FS2 are movable relative to each other in the telescopic direction D1 to absorb shocks from rough terrain. For example, the fluid passageway (not shown) of the valve structure FS3 is released by the valve (not shown) of the valve structure FS3 in the locked state. The first electric actuator FS4 is operatively coupled to the valve structure FS3 to change a state of the valve structure FS3 between the unlocked state and the locked state. Valve structures for bicycle suspensions are well known in the bicycle field. Thus, the valve structure FS3 can be any type of suitable lockout device as needed and/or desired.

The electric suspension FS can have an intermediate state between the unlocked state and the locked state. For example, a cross section of the fluid passageway (not shown) at the valve (not shown) in the intermediate state is smaller than a cross section of the fluid passageway (not shown) at the valve (not shown) in the unlocked state.

Similarly, the electric suspension FS comprises a third suspension tube FS5, a fourth suspension tube FS6, and a stroke adjustment structure FS7. The third suspension tube FS5 has a center axis A12. The fourth suspension tube FS6 is telescopically received in the third suspension tube FS5.

In this embodiment, the stroke adjustment structure FS7 is configured to change a stroke of the electric suspension FS. The stroke adjustment structure FS7 is configured to change a relative position of the third suspension tube FS5 and the fourth suspension tube FS6 between a long-stroke position and a short-stroke position in the telescopic direction D1 in a rest state where the third suspension tube FS5 and the fourth suspension tube FS6 do not receive a compression force. The stroke adjustment structure FS7 is manually operated by the user to change the resistance. Stroke adjustment devices for bicycle suspensions are well known in the bicycle field. Thus, the stroke adjustment structure FS7 can be any type of suitable stroke adjustment device as needed and/or desired.

The second and fourth suspension tubes FS2 and FS6 are coupled to a crown FS8. The first suspension tube FS1 is coupled to the third suspension tube FS5 with a coupling arm FS9. The first and third suspension tubes FS1 and FS5 are integrally movable relative to the second and fourth suspension tubes FS2 and FS6 to absorb shocks. In the unlocked state of the valve structure FS3, the first suspension tube FS1 and the third suspension tube FS5 are respectively movable relative to the second suspension tube FS2 and the fourth suspension tube FS6 in the telescopic direction D1 to absorb shocks from rough terrain.

As seen in FIG. 3, the first electric component EC1 further comprises a valve position sensor FS10 and an actuator driver FS11. The first electric actuator FS4, the valve position sensor FS10, and the actuator driver FS11 are connected to each other with a bus FS12. The first electric actuator FS4, the valve position sensor FS10, and the actuator driver FS11 constitute a suspension motor unit FS13.

The first electric component EC1 includes a first controller CR1 and a sensor SS1. The first controller CR1 and the sensor SS1 are mounted to the electric suspension FS. However, at least one of the first controller CR1 and the sensor SS1 can be mounted to the electric suspension RS or other positions.

The sensor SS1 includes an acceleration sensor SS11 to sense acceleration applied to the bicycle 10. An output SS12 of the sensor SS1 includes a value or a signal indicative of an acceleration. The sensor SS1 is attached to the first electric component EC1. In this embodiment, as seen in FIG. 2, the sensor SS1 is attached to the first suspension tube FS1. However, the sensor SS1 can be attached to another member such as the third suspension tube FS5 and the bicycle body B.

The first controller CR1 has a manual mode and an automatic mode. The first controller CR1 change a control mode to the manual mode in response to the manual-mode operation signal OS23A. The first controller CR1 changes the control mode to the automatic mode in response to the automatic-mode operation signal OS23B. In the manual mode, the first controller CR1 is configured to control an operating status of the first electric component EC1 based on the unlock and lock operation signals CS12A and CS12B. In the automatic mode, the first controller CR1 is configured to control an operating status of the first electric component EC1 based on the output SS12 of the sensor SS1. The operating status of the first electric component EC1 includes the unlocked and locked states and the stroke of the first electric component EC1. The first controller CR1, the sensor SS1, and the suspension motor unit FS13 are electrically connected to each other with a bus CR14.

In the manual mode, the first controller CR1 is configured to control the first electric actuator FS4 based on the unlock operation signal OS12A and the lock operation signal OS12B transmitted from the bicycle operating device OD. The first controller CR1 is configured to generate an unlock control signal CS12A in response to the unlock operation signal OS12A. The first controller CR1 is configured to generate a lock control signal CS12B in response to the lock operation signal OS12B.

In the automatic mode, the first controller CR1 is configured to control the first electric actuator FS4 based on the output SS12 of the sensor SS1. For example, the bicycle 10 runs on a rough road in a case where the output SS12 (the acceleration) of the sensor SS1 is larger than a first threshold. The bicycle 10 runs on a relatively flat road in a case where the output SS12 (the acceleration) of the sensor SS1 is smaller than a second threshold smaller than the first threshold. The first controller CR1 generates the unlock control signal CS12A in the case where the output SS12 of the sensor SS1 is larger than the first threshold for a specific time. The first controller CR1 generates the lock control signal CS12B in the case where the output SS12 of the sensor SS1 is smaller than the second threshold for a specific time.

As seen in FIG. 3, the first controller CR1 is constituted as a microcomputer and includes a processor CR11 and a memory CR12. The processor CR11 includes a CPU and a memory controller. The memory CR12 includes a ROM and a RAM. The ROM includes a non-transitory computer-readable storage medium. The RAM includes a transitory computer-readable storage medium. The memory CR12 includes storage areas each having an address in the ROM and the RAM. The processor CR11 controls the memory CR12 to store data in the storage areas of the memory CR12 and reads data from the storage areas of the memory CR12.

At least one program is stored in the memory CR12 (e.g., the ROM). The at least one program is read into the processor CR11, and thereby functions of the first controller CR1 are performed. The processor CR11 and the memory CR12 are mounted on a circuit board CR13 and are connected to each other with the bus CR14. The first controller CR1 can also be referred to as a first control circuit or circuitry CR1.

The valve position sensor FS10 is configured to sense the state of the valve structure FS3 with the first electric actuator FS4. In this embodiment, the valve position sensor FS10 is a contact rotational position sensor such as a potentiometer. The valve position sensor FS10 is configured to sense an absolute rotational position of the rotational shaft of the first electric actuator FS4 as the state of the valve structure FS3. Other examples of the valve position sensor FS10 include a non-contact rotational position sensor such as an optical sensor (e.g., a rotary encoder) and a magnetic sensor (e.g., a hall sensor).

The valve position sensor FS10 is electrically connected to the actuator driver FS11. The actuator driver FS11 is configured to control the first electric actuator FS4 based on the unlock control signal CS12A, the lock control signal CS12B, and the position sensed by the valve position sensor FS10. Specifically, the actuator driver FS11 is configured to control the first electric actuator FS4 to change the state of the valve structure FS3 to the unlocked state based on the sensed position and the unlock control signal CS12B. The actuator driver FS11 is configured to control the first electric actuator FS4 to change the state of the valve structure FS3 to the locked state based on the sensed position and the lock control signal CS12A.

As seen in FIG. 3, the bicycle electric system 12 comprises a second controller CR2. The second controller CR2 can also be referred to as a controller CR2. Namely, the bicycle electric system 12 comprises the controller CR2. In this embodiment, the second controller CR2 is provided in the battery holder PS2. However, the second controller CR2 can be provided at other locations such as the electric shifting device RD, the electric adjustable seatpost SP, and the electric drive unit DU. The second controller CR2 is electrically connected to the bicycle operating device OD, the first electric component EC1, the second electric component EC2, and the electric drive unit DU with the electric communication path CP.

The second controller CR2 is constituted as a microcomputer and includes a processor CR21 and a memory CR22. The processor CR21 includes a CPU and a memory controller. The memory CR22 includes a ROM and a RAM. The ROM includes a non-transitory computer-readable storage medium. The RAM includes a transitory computer-readable storage medium. The memory CR22 includes storage areas each having an address in the ROM and the RAM. The processor CR21 controls the memory CR22 to store data in the storage areas of the memory CR22 and reads data from the storage areas of the memory CR22.

At least one program is stored in the memory CR22 (e.g., the ROM). The at least one program is read into the processor CR21, and thereby functions of the second controller CR2 are performed. The processor CR21 and the memory CR22 are mounted on a circuit board CR23 and are connected to each other with a bus CR24. The second controller CR2 can also be referred to as a second control circuit or circuitry CR2.

The second controller CR2 has a manual mode and an automatic mode. The second controller CR2 change a control mode to the manual mode in response to the manual-mode operation signal OS23A. The second controller CR2 changes the control mode to the automatic mode in response to the automatic-mode operation signal OS23B. In the manual mode, the second controller CR2 is configured to control an operating status of the second electric component EC2 based on the output of the bicycle operating device OD. In the automatic mode, the second controller CR2 is configured to control an operating status of the second electric component EC2 based on the output SS12 of the sensor SS1 of the first electric component EC1. In the automatic mode, the controller CR2 is configured to control the operating status of the electric component EC2 based on the output SS12 of the sensor SS1 of the electric suspension FS.

In the manual mode, the second controller CR2 is configured to generate an upshift control signal CS11 in response to the upshift operation signal OS11. The second controller CR2 is configured to generate a downshift control signal CS21 in response to the downshift operation signal OS21. The second controller CR2 is configured to generate a first seatpost control signal CS22A in response to the first seatpost operation signal OS22A. The second controller CR2 is configured to generate a second seatpost control signal CS22B in response to the second seatpost operation signal OS22B. The second controller CR2 is configured to generate a first-mode control signal CS13A in response to the first-mode operation signal OS13A. The second controller CR2 is configured to generate a second-mode control signal CS13B in response to the second-mode operation signal OS13B. The second controller CR2 is configured to generate a third-mode control signal CS13C in response to the third-mode operation signal OS13C. The automatic mode will be described in detail later.

As seen in FIG. 2, the second controller CR2 is electrically connectable to the first electric component EC1 with the electric cable to communicate with the first electric component EC1 through the electric cable. In this embodiment, the second controller CR2 is electrically connected to the first electric component EC1 with the electric cables C1 and C4 and the electric junction J1 to communicate with the first electric component EC1 through the electric cables C1 and C4 and the electric junction J1. However, the second controller CR2 can be wirelessly connected to the first electric component EC1.

Figure 5:
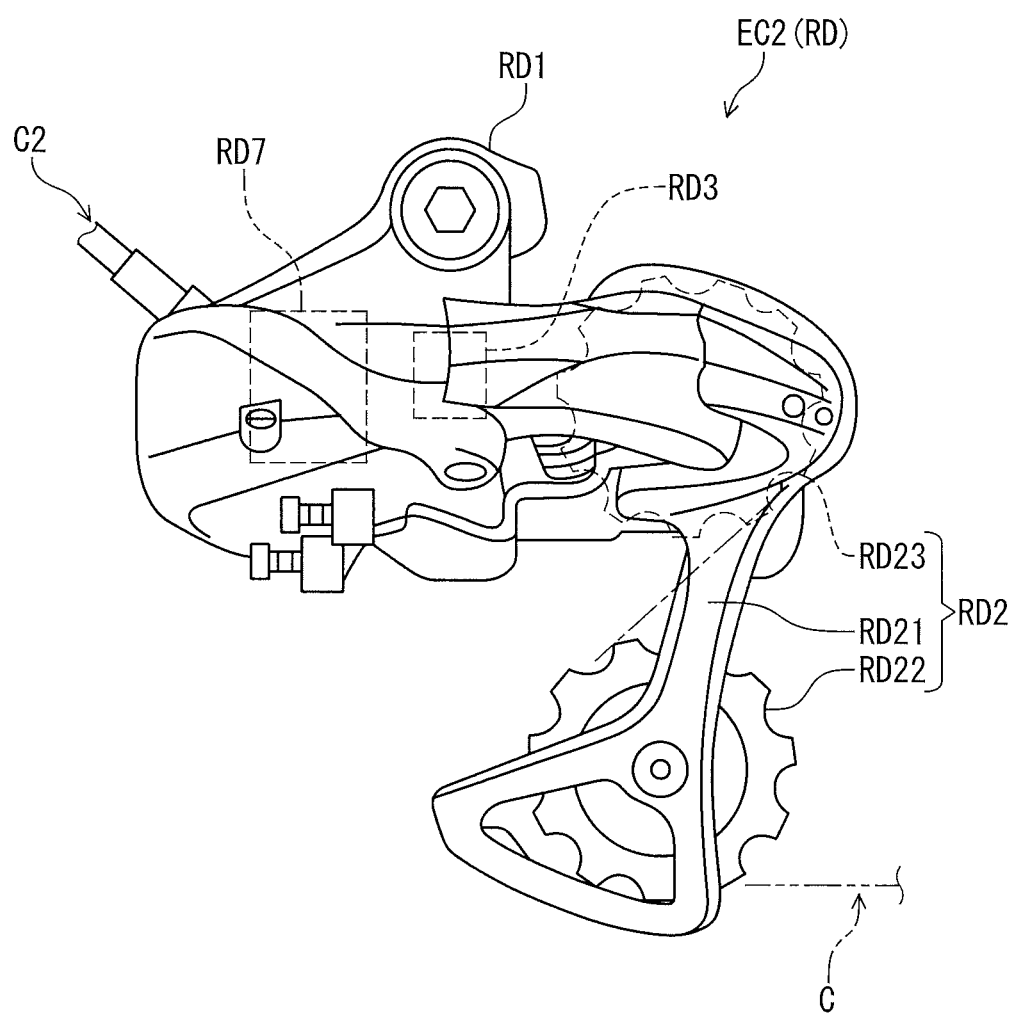
FIG. 5 is a side elevational view of an electric shifting device of the bicycle electric system illustrated in FIG. 1.

As seen in FIG. 5, the electric shifting device RD of the second electric component EC2 includes a base member RD1, a movable member RD2, and a second electric actuator RD3. The second electric actuator RD3 can also be referred to as a shifting electric actuator RD3. The movable member RD2 is movably coupled to the base member RD1. The movable member RD2 is movable relative to the base member RD1 to change a gear stage of the electric shifting device RD. The shifting electric actuator RD3 is operatively coupled to the movable member to move the movable member RD2 relative to the base member RD1. The base member RD1 is attached to the bicycle body B (FIG. 1). The shifting electric actuator RD3 is configured to move the movable member RD2 relative to the base member RD1 to shift the bicycle chain C relative to the rear sprocket assembly BC2. The shifting electric actuator RD3 is provided in the base member RD1. However, the shifting electric actuator RD3 can be provided at the movable member RD2 or other positions.

In this embodiment, the movable member RD2 includes a chain guide RD21, a first pulley RD22, and a second pulley RD23. The chain guide RD21 is movably coupled to the base member RD1. The first pulley RD22 is rotatably coupled to the chain guide RD21. The second pulley RD23 is rotatably coupled to the chain guide RD21. The bicycle chain C is engaged with the first pulley RD22 and the second pulley RD23.

The shifting electric actuator RD3 is operatively coupled to the movable member RD2 (the chain guide RD21). In this embodiment, the shifting electric actuator RD3 includes a direct-current (DC) motor having a rotational shaft mechanically coupled to the movable member RD2. Other examples of the shifting electric actuator RD3 include a stepper motor and an alternating-current (AC) motor.

As seen in FIG. 3, the electric shifting device RD of the second electric component EC2 comprises a shift position sensor RD4 and a shifting actuation driver RD5. The shifting electric actuator RD3, the shift position sensor RD4, and the shifting actuation driver RD5 are connected to each other with a bus RD6. The shifting electric actuator RD3, the shift position sensor RD4, and the shifting actuation driver RD5 constitute a motor unit RD7. The electric shifting device RD has a plurality of available shift positions. In this embodiment, the electric shifting device RD has twelve available shift positions respectively corresponding to the first to twelfth rear sprockets R1 to R12 (FIG. 1).

The shift position sensor RD4 is configured to sense a position of the shifting electric actuator RD3 as the shift position of the electric shifting device RD. In this embodiment, the shift position sensor RD4 is a contact rotational position sensor such as a potentiometer. The shift position sensor RD4 is configured to sense an absolute rotational position of the rotational shaft of the shifting electric actuator RD3 as the shift position of the electric shifting device RD. Other examples of the shift position sensor RD4 include a non-contact rotational position sensor such as an optical sensor (e.g., a rotary encoder) and a magnetic sensor (e.g., a hall sensor).

The shift position sensor RD4 is electrically connected to the shifting actuation driver RD5. The shifting actuation driver RD5 is configured to control the shifting electric actuator RD3 based on the shift position sensed by the shift position sensor RD4. Specifically, the shifting actuation driver RD5 is electrically connected to the shifting electric actuator RD3. The shifting actuation driver RD5 is configured to control a rotational direction and a rotational speed of the rotational shaft based on the shift position and each of upshift and downshift control signals CS11 and CS21. The shifting actuation driver RD5 controls the shifting electric actuator RD3 to move the movable member RD2 relative to the base member RD1 in an upshifting direction in response to the upshift control signal CS11. The shifting actuation driver RD5 controls the shifting electric actuator RD3 to move the movable member RD2 relative to the base member RD1 in a downshifting direction in response to the downshift control signal CS21.

Furthermore, the shifting actuation driver RD5 is configured to stop rotation of the rotational shaft to position the chain guide RD21 at one of the low to top gear positions based on the shift position and each of the upshift and downshift control signals CS11 and CS21. The shifting actuation driver RD5 transmits the shift position sensed by the shift position sensor RD4 to the second controller CR2. The second controller CR2 stores the shift position transmitted from the shifting actuation driver RD5 as a latest rear shift position. For example, the shifting actuation driver RD5 includes an electric circuit configured to perform the above configuration of the shifting actuation driver RD5.

Figure 6:
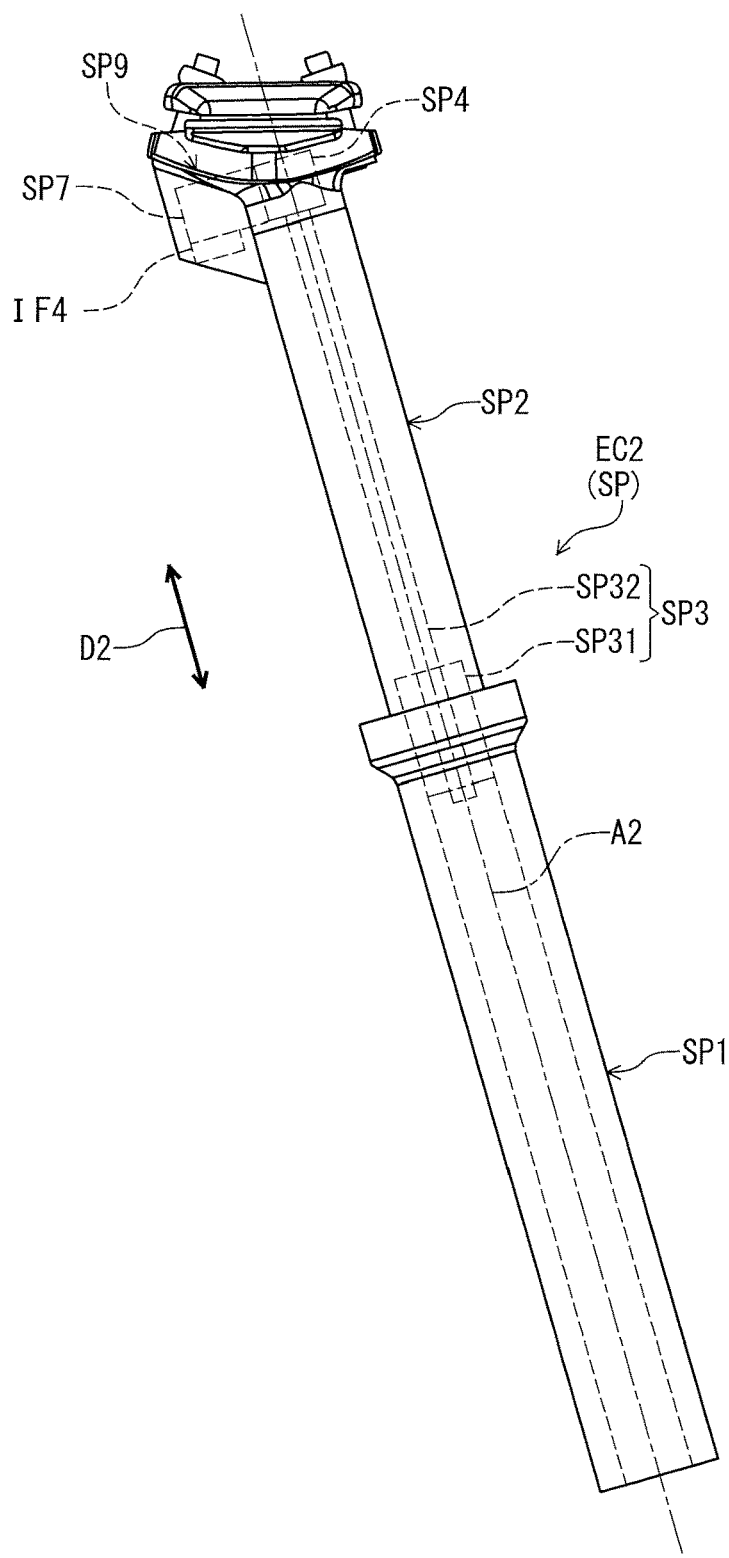
FIG. 6 is a side elevational view of an electric adjustable seatpost of the bicycle electric system illustrated in FIG. 1.

As seen in FIG. 6, the electric adjustable seatpost SP includes a first tube SP1, a second tube SP2, a positioning structure SP3, and a second electric actuator SP4. The second electric actuator SP4 can also be referred to as a seatpost electric actuator SP4. The electric adjustable seatpost SP has the positioning state and the adjustable state. In the positioning state, the first tube SP1 and the second tube SP2 are fixedly positioned relative to each other in a telescopic direction D2 to maintain an overall length of the electric adjustable seatpost SP. In the adjustable state, the first tube SP1 and the second tube SP2 are relatively movable relative to each other in the telescopic direction D2 to change the overall length.

The first tube SP1 has a center axis A2. The first tube SP1 is secured to the bicycle body B (FIG. 1) with a clamp B6 (FIG. 1). The second tube SP2 is telescopically received in the first tube SP1. The positioning structure SP3 is configured to relatively position the first tube SP1 and the second tube SP2 in the telescopic direction D2 parallel to the center axis A2 of the first tube SP1. The second electric actuator SP4 is configured to actuate the positioning structure SP3. The seatpost electric actuator SP4 is coupled to the positioning structure SP3 to actuate the positioning structure SP3. In this embodiment, the seatpost electric actuator SP4 is mounted on an upper end of the second tube SP2. However, the seatpost electric actuator SP4 can be provided at other positions in the electric adjustable seatpost SP. For example, the seatpost electric actuator SP4 can be provided at a lower end of an interior of the first tube SP1 or an upper end of the first tube SP1.

The positioning structure SP3 includes a guide SP31 and a screw rod SP32. The guide SP31 is secured to the first tube SP1 and extends in the first tube SP1. The guide SP31 includes a threaded hole SP33. The screw rod SP32 is threadedly engaged with the threaded hole SP33. The seatpost electric actuator SP4 is coupled to the screw rod SP32 to rotate the screw rod SP32 relative to the second tube SP2. Rotation of the screw rod SP32 moves the second tube SP2 relative to the first tube SP1 in the telescopic direction D2.

As seen in FIG. 3, the electric adjustable seatpost SP includes a seatpost position sensor SP6 and a seatpost actuator driver SP7. The seatpost electric actuator SP4, the seatpost position sensor SP6, and the seatpost actuator driver SP7 are connected to each other with a bus SP8. The seatpost electric actuator SP4, the seatpost position sensor SP6, and the seatpost actuator driver SP7 constitute a seatpost motor unit SP9. The seatpost actuator driver SP7 is configured to control the seatpost electric actuator SP4 based on the first and second seatpost control signals CS22A and CS22B to move the second tube SP2 relative to the first tube SP1 in the telescopic direction D2. The seatpost actuator driver SP7 controls the seatpost electric actuator SP4 to move the second tube SP2 for lengthening the electric adjustable seatpost SP in response to the first seatpost control signal CS22A. The seatpost actuator driver SP7 controls the seatpost electric actuator SP4 to move the second tube SP2 for shortening the electric adjustable seatpost SP in response to the second seatpost control signal CS22B.

The seatpost position sensor SP6 is configured to sense a rotational position of the screw rod SP32. In this embodiment, the seatpost position sensor SP6 is a contact rotational position sensor such as a potentiometer. The seatpost position sensor SP6 is configured to sense an absolute rotational position of the rotational shaft of the seatpost electric actuator SP4. Other examples of the seatpost position sensor SP6 include a non-contact rotational position sensor such as an optical sensor (e.g., a rotary encoder) and a magnetic sensor (e.g., a hall sensor).

The seatpost position sensor SP6 is electrically connected to the seatpost actuator driver SP7. The seatpost actuator driver SP7 is configured to control the seatpost electric actuator SP4 based on the first or second seatpost control signal CS22A or CS22B and the position sensed by the seatpost position sensor SP6. Specifically, the seatpost actuator driver SP7 is electrically connected to the seatpost electric actuator SP4 to control a rotational direction of the rotational shaft based on the rotational position and the first or second seatpost control signal CS22A or CS22B generated by the second controller CR2. The seatpost actuator driver SP7 controls the seatpost electric actuator SP4 to stop rotating the rotational shaft when the overall length of the electric adjustable seatpost SP reaches the maximum length or the minimum length regardless of the first and second seatpost control signals CS22A and CS22B.

As seen in FIG. 3, the electric drive unit DU includes an assist motor DU1, a torque sensor DU2, and an assist motor driver DU3. The assist motor DU1 is configured to generate the auxiliary drive force. The assist motor DU1 is coupled to the crank assembly BC1 to transmit the auxiliary drive force. The torque sensor DU2 is configured to sense an input torque applied to the crank assembly BC1 from the rider during pedaling. The torque sensor DU2 is attached to the crank assembly BC1. Examples of the torque sensor DU2 include a strain gauge. The assist motor driver DU3 is electrically connected to the assist motor DU1 and the torque sensor DU2 to control the assist motor DU1 based on the input torque sensed by the torque sensor DU2.

The electric drive unit DU has a first assist mode, a second assist mode, and a third assist mode. The first assist mode has a first assist ratio. The second assist mode has a second assist ratio. The third assist mode has a third assist ratio. In this embodiment, the first assist ratio is the highest among the first to third assist ratios. The third assist ratio is the lowest among the first to third assist ratios.

In the first assist mode, the assist motor driver DU3 controls the assist motor DU1 to generate the auxiliary drive force in accordance with the first assist ratio and the input torque sensed by the torque sensor DU2. In the first assist mode, the assist motor driver DU3 controls the assist motor DU1 to generate the auxiliary drive force having a torque obtained by multiplying the input torque by the first assist ratio. In the second assist mode, the assist motor driver DU3 controls the assist motor DU1 to generate the auxiliary drive force having a torque obtained by multiplying the input torque by the second assist ratio. In the third assist mode, the assist motor driver DU3 controls the assist motor DU1 to generate the auxiliary drive force having a torque obtained by multiplying the input torque by the third assist ratio.

The electric drive unit DU is configured to change an assist mode among the first to third assist modes in response to the first-mode to third-mode control signals CS13A to CS13C. The electric drive unit DU changes the assist mode to the first assist mode in response to the first-mode control signal CS13A. The electric drive unit DU changes the assist mode to the second assist mode in response to the second-mode control signal CS13B. The electric drive unit DU changes the assist mode to the third assist mode in response to the third-mode control signal CS13C. The memory CR22 stores the first to third assist ratios.

In this embodiment, the first electric component EC1, the second electric component EC2, the electric drive unit DU, the power supply PS, and the bicycle operating device OD communicate with each other via the electric communication path CP using power line communication (PLC) technology. More specifically, each of the electric cables C1 to C7 includes a ground line and a voltage line that are detachably connected to a serial bus that is formed by communication interfaces and the electric junctions J1 and J2. In this embodiment, the first electric component EC1, the second electric component EC2, the electric drive unit DU, the power supply PS, and the bicycle operating device OD can all communicate with each other through the voltage line using the power line communication technology.

The PLC technology is used for communicating between electric components. The PLC carries data on a conductor that is also used simultaneously for electric power transmission or electric power distribution to the electric components. In this embodiment, electricity is supplied from the power supply PS to the first electric component EC1, the second electric component EC2, the electric drive unit DU, the power supply PS, and the bicycle operating device OD via the electric communication path CP. Furthermore, the second controller CR2 can receive information signals from the first electric component EC1, the second electric component EC2, the electric drive unit DU, the power supply PS, and the bicycle operating device OD via the electric communication path CP using the PLC.

The PLC uses unique identifying information such as a unique identifier that is assigned to each of the first electric component EC1, the second electric component EC2, the electric drive unit DU, the power supply PS, the first operating device OD1, and the second operating device OD2. Each of the electric components EC1, EC2, DU, OD1, and OD2 includes a memory in which the unique identifying information is stored. Based on the unique identifying information, each of the electric components EC1, EC2, DU, OD1, and OD2 can recognize, based on the unique identifying information, information signals which are necessary for itself among information signals transmitted via the electric communication path CP. For example, the bicycle electric system 12 can recognize information signals transmitted from the first electric component EC1, the second electric component EC2, and the power supply PS with the electric communication path CP. Instead of using the PLC technology, however, separate signal wires can be provided for transmitting data in addition to the ground wire and the voltage wire if needed and/or desired.

As seen in FIG. 3, the first electric component EC1 includes a first interface IF1 configured to communicate using a first communication protocol. The first interface IF1 is electrically connected to the first controller CR1. In this embodiment, the first communication protocol is different from the PLC. Examples of the first interface IF1 include Serial Peripheral Interface (SPI) and Universal Asynchronous Receiver/Transmitter (DART). However, the first communication protocol can use the PLC. The first interface IF1 can also be referred to as a first interface circuit or circuitry IF1.

The second controller CR2 includes a second interface IF2 electrically connectable to the second electric component EC2 to communicate with the second electric component EC2 using a second communication protocol different from the first communication protocol. In this embodiment, the second communication protocol is the PLC.

The second interface IF2 includes a circuit configured to transmit and receive a signal to and from other components via the electric communication path CP using the PLC. The second interface IF2 is configured to separate input signals to the power source voltage and information signals (e.g., the output SS12 of the sensor SS1). The second interface IF2 is configured to regulate the power source voltage to a level at which various components of the first electric component 14 can properly operate. The second interface IF2 is configured to superimpose control signals (e.g., at least one of the control signals CS11, CS12A, CS12B, CS21, CS22A, CS22B, and CS13A to CS13C) to the power source voltage.

The bicycle electric system 12 further comprises a protocol converter PC. The protocol converter PC is electrically connectable to the first electric component EC1 and the second controller CR2 to convert one of the first communication protocol and the second communication protocol to the other of the first communication protocol and the second communication protocol. In this embodiment, the protocol converter PC is electrically connected to the first electric component EC1 and the second controller CR2 with the electric communication path CP to convert the first communication protocol to the second communication protocol. However, the protocol converter PC can be omitted from the bicycle electric system 12 in a case where the second communication protocol is the same as the first communication protocol.

As seen in FIG. 3, the electric shifting device RD includes an interface IF3 electrically connectable to the second interface IF2 to communicate with the second controller CR2 using the second communication protocol (the PLC). In this embodiment, the interface IF3 is electrically connected to the second interface IF2 with the electric cables C2 and C4 and the electric junction J1.

The electric adjustable seatpost SP includes an interface IF4 electrically connectable to the second interface IF2 to communicate with the second controller CR2 using the second communication protocol (the PLC). In this embodiment, the interface IF4 is electrically connected to the second interface IF2 with the electric cables C3 and C4 and the electric junction J1.

The electric drive unit DU includes an interface IF5 electrically connectable to the second interface IF2 to communicate with the second controller CR2 using the second communication protocol (the PLC). In this embodiment, the interface IF5 is electrically connected to the second interface IF2 with the electric cables C4 and C5 and the electric junction J1.

The first operation interface OD15 is configured to communicate with the second controller CR2 using the second communication protocol (the PLC). In this embodiment, the first operation interface OD15 is electrically connected to the second interface IF2 with the electric cables C4, C6 and C8 and the electric junctions J1 and J2.

The second operation interface OD25 is configured to communicate with the second controller CR2 using the second communication protocol (the PLC). In this embodiment, the second operation interface OD25 is electrically connected to the second interface IF2 with the electric cables C4, C7 and C8 and the electric junctions J1 and J2.

The interfaces IF3 to IF5 and the first and second operation interfaces OD15 and OD25 have substantially the same structure as that of the second interface IF2. Thus, they will not be described in detail here for the sake of brevity.

The automatic mode of the second controller CR2 will be described in detail below referring to FIG. 7.

Figure 7:
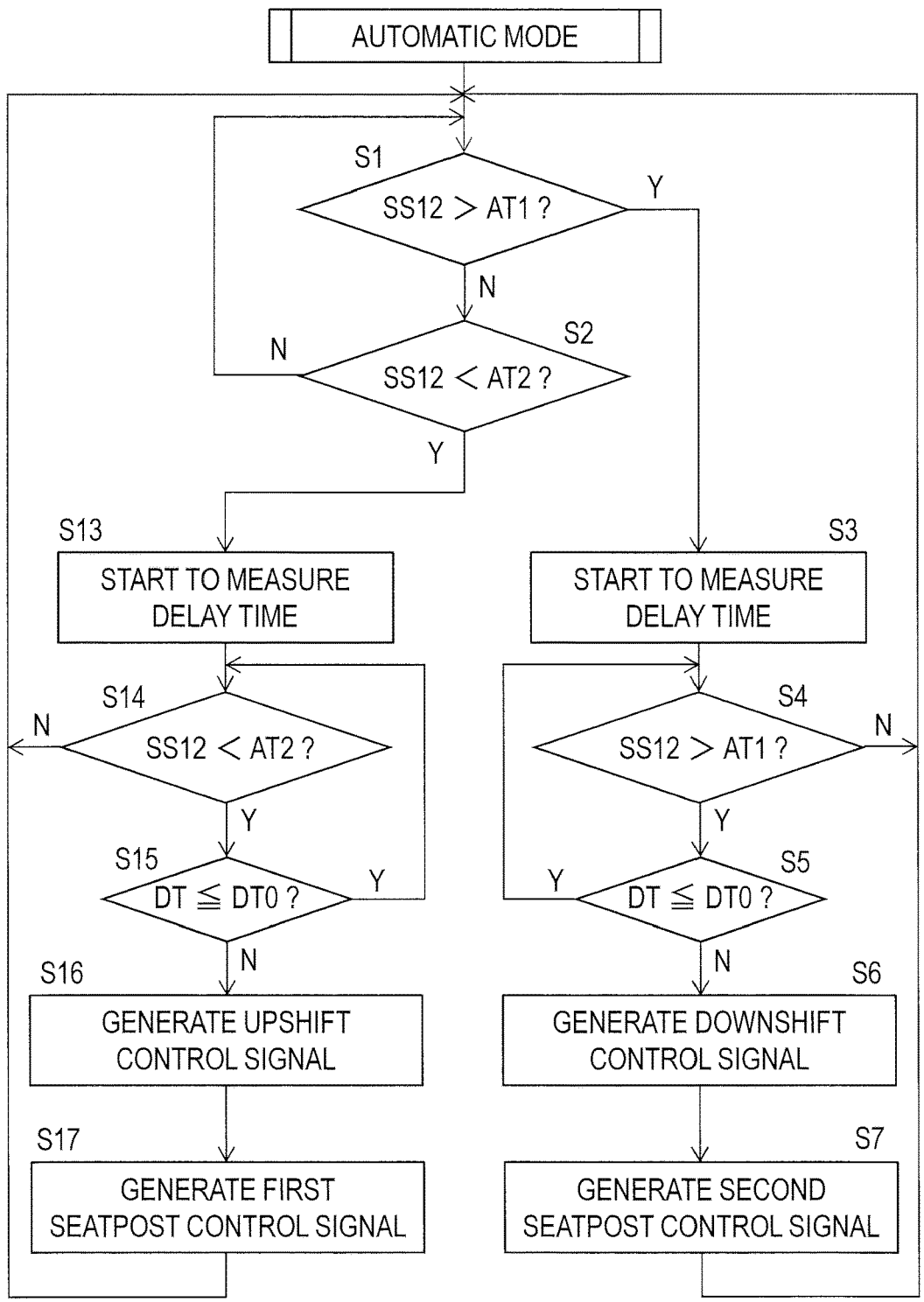
FIG. 7 is a flow chart of controlling of the bicycle electric system illustrated in FIG. 1.

As seen in FIG. 7, the second controller CR2 is configured to compare the output SS12 of the sensor SS1 with acceleration thresholds AT1 and AT2 (steps S1 and S2). Specifically, the second controller CR2 determines if the output SS12 of the sensor SS1 is larger than the acceleration threshold AT1 (step S1). The second controller CR2 determines if the output SS12 of the sensor SS1 is smaller than the acceleration threshold AT2 when the second controller CR2 concludes that the output SS12 of the sensor SS1 is equal to or smaller than the acceleration threshold AT1 (steps S1 and S2). The process returns to the step S1 when the second controller CR2 concludes that the output SS12 of the sensor SS1 is equal to or larger than the acceleration threshold AT2 (step S2). Thus, the second controller CR2 repeatedly compares the output SS12 of the sensor SS1 with the acceleration thresholds AT1 and AT2 until the second controller CR2 concludes that the output SS12 of the sensor SS1 is larger than the acceleration threshold AT1 or smaller than the acceleration threshold AT2 (steps S1 and S2).

In this embodiment, the acceleration threshold AT1 is different from the acceleration threshold AT2. The acceleration threshold AT1 is larger than the acceleration threshold AT2. However, the acceleration threshold AT1 can be equal to or smaller than the acceleration threshold AT2.

As seen in FIG. 7, the second controller CR2 is configured to control the electric shifting device RD to downshift in a case where the second controller CR2 concludes that the output SS12 of the acceleration sensor SS11 is larger than the acceleration threshold AT1. The second controller CR2 is configured to control the electric adjustable seatpost SP to shorten the electric adjustable seatpost SP in the case where the second controller CR2 concludes that the output SS12 of the acceleration sensor SS11 is larger than the acceleration threshold AT1.

In this embodiment, the second controller CR2 determines if the output SS12 of the acceleration sensor SS11 keeps larger than the acceleration threshold AT1 during a reference delay time DT0. Specifically, the second controller CR2 starts to measure a delay time DT when the second controller CR2 concludes that the output SS12 of the acceleration sensor SS11 is larger than the acceleration threshold AT1 (steps S1 and S3). After the step S3, the second controller CR2 determines if the output SS12 of the acceleration sensor SS11 is larger than the acceleration threshold AT1 (step S4). The process returns to the step S1 when the second controller CR2 concludes that the output SS12 of the acceleration sensor SS11 is equal to or smaller than the acceleration threshold AT1 (step S4).

When the second controller CR2 concludes that the output SS12 of the acceleration sensor SS11 is larger than the acceleration threshold AT1, the second controller CR2 determines if the delay time DT is equal to or shorter than the reference delay time DT0 (steps S4 and S5). When the second controller CR2 concludes that the delay time DT is equal to or shorter than the reference delay time DT0, the steps S4 and S5 are repeatedly executed.

When the delay time DT is longer than the reference delay time DT0, the second controller CR2 generates the downshift control signal CS21 and the second seatpost control signal CS22B (step S5 to S7). In response to the downshift control signal CS21, the shifting actuation driver RD5 controls the shifting electric actuator RD3 to move the movable member RD2 relative to the base member RD1 in the downshifting direction by one speed stage. In response to the second seatpost control signal CS22B, the seatpost actuator driver SP7 controls the seatpost electric actuator SP4 to shorten the electric adjustable seatpost SP by a specific length. After the steps S6 and S7, the process returns to the step S1.

On the other hand, the second controller CR2 is configured to control the electric shifting device RD to upshift in a case where the second controller CR2 concludes that the output SS12 of the acceleration sensor SS11 is smaller than the acceleration threshold AT2. The second controller CR2 is configured to control the electric adjustable seatpost SP to lengthen the electric adjustable seatpost SP in the case where the second controller CR2 concludes that the output SS12 of the acceleration sensor SS11 is smaller than the acceleration threshold AT2.

In this embodiment, the second controller CR2 determines if the output SS12 of the acceleration sensor SS11 keeps smaller than the acceleration threshold AT2 during the reference delay time DT0. Specifically, the second controller CR2 starts to measure the delay time DT when the second controller CR2 concludes that the output SS12 of the acceleration sensor SS11 is smaller than the acceleration threshold AT2 (steps S2 and S13). After the step S3, the second controller CR2 determines if the output SS12 of the acceleration sensor SS11 is smaller than the acceleration threshold AT2 (step S14). The process returns to the step S1 when the second controller CR2 concludes that the output SS12 of the acceleration sensor SS11 is equal to or larger than the acceleration threshold AT2 (step S14).

When the second controller CR2 concludes that the output SS12 of the acceleration sensor SS11 is smaller than the acceleration threshold AT2, the second controller CR2 determines if the delay time DT is equal to or shorter than the reference delay time DT0 (steps S14 and S15). When the second controller CR2 concludes that the delay time DT is equal to or larger than the reference delay time DT0, the steps S14 and S15 are repeatedly executed.

When the delay time DT is longer than the reference delay time DT0, the second controller CR2 generates the upshift control signal CS11 and the first seatpost control signal CS22A (step S15 to S17). In response to the upshift control signal CS11, the shifting actuation driver RD5 controls the shifting electric actuator RD3 to move the movable member RD2 relative to the base member RD1 in the upshifting direction by one speed stage. In response to the first seatpost control signal CS22A, the seatpost actuator driver SP7 controls the seatpost electric actuator SP4 to lengthen the electric adjustable seatpost SP by a specific length. After the steps S16 and S17, the process returns to the step S1.

Second Embodiment

A bicycle electric system 212 in accordance with a second embodiment will be described below referring to FIG. 8. The bicycle electric system 212 has the same structure and/or configuration as those of the bicycle electric system 12 except for the PLC. Thus, elements having substantially the same function as those in the first embodiment will be numbered the same here, and will not be described and/or illustrated again in detail here for the sake of brevity.

Figure 8:
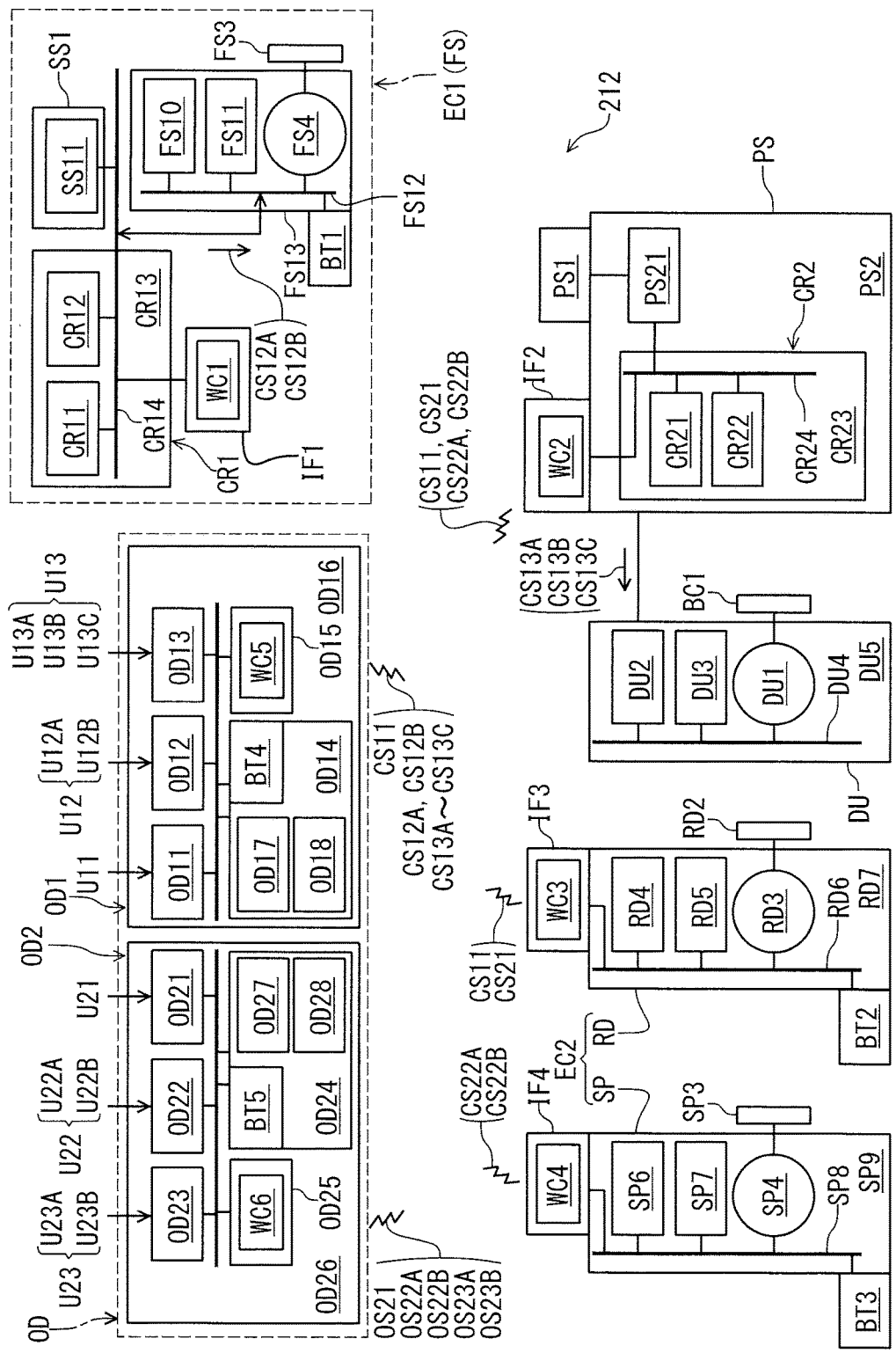
FIG. 8 is a block diagram of a bicycle electric system in accordance with a second embodiment.

As seen in FIG. 8, in the bicycle electric system 212, the second controller CR2 is electrically connectable to the first electric component EC1 with a wireless communication path CP2 to communicate wirelessly with the first electric component EC1 through the wireless communication path CP2. The electric communication path CP includes the wireless communication path CP2. The electric cables C1 to C8 and the electric junctions J1 and J2 are omitted from the electric communication path CP. In this embodiment, the first interface IF1 includes a wireless communicator WC1. The second interface IF2 includes a wireless communicator WC2. The interfaces IF3 and IF4 and the first and second operation interfaces OD15 and OD25 include wireless communicators WC3 to WC6. The interface IF5 is omitted from the electric drive unit DU, and the electric drive unit DU is electrically connected to the battery holder PS2 directly.

The wireless communicator WC2 of the second interface IF2 is wirelessly connected to the wireless communicators WC1 and WC3 to WC6. The wireless communicator WC2 includes a circuit configured to establish wireless communication with the wireless communicators WC1 and WC3 to WC6. The circuit of the wireless communicator WC2 is configured to recognize wireless signals transmitted from each of the wireless communicators WC1 and WC3 to WC6. The second controller CR2 wirelessly receives the output SS12 of the sensor SS1 and the operation signals OS11, OS12A, OS12B, OS13A to 13C, OS21, OS22A, and OS22B via the wireless communication path CP2. The second controller CR2 wirelessly transmits the control signals CS11, CS13A to CS13C, CS21, CS22A, and CS22B via the wireless communication path CP2. The wireless communicator WC3 includes a circuit configured to recognize the upshift and downshift control signals CS11 and CS21. The wireless communicator WC4 includes a circuit configured to recognize the first and second seatpost control signals CS22A and CS22B. The wireless communicators WC1 to WC6 includes a configuration that has been known in the bicycle field. Thus, they will not be described in detail here for the sake of brevity.

The first operating device OD1, the second operating device OD2, the first electric component EC1, and the second electric component EC2 (the electric shifting device RD and the electric adjustable seatpost SP) include batteries BT1 to BT5. The batteries BT1 to BT5 supply electricity to the first operating device OD1, the second operating device OD2, the first electric component EC1, and the second electric component EC2 (the electric shifting device RD and the electric adjustable seatpost SP) instead of the power supply PS.

Third Embodiment

A bicycle electric system 312 in accordance with a third embodiment will be described below referring to FIGS. 9 and 10. The bicycle electric system 312 has the same structure and/or configuration as those of the bicycle electric system 12 except for the first and second electric components EC1 and EC2. Thus, elements having substantially the same function as those in the first embodiment will be numbered the same here, and will not be described and/or illustrated again in detail here for the sake of brevity.

Figure 9:
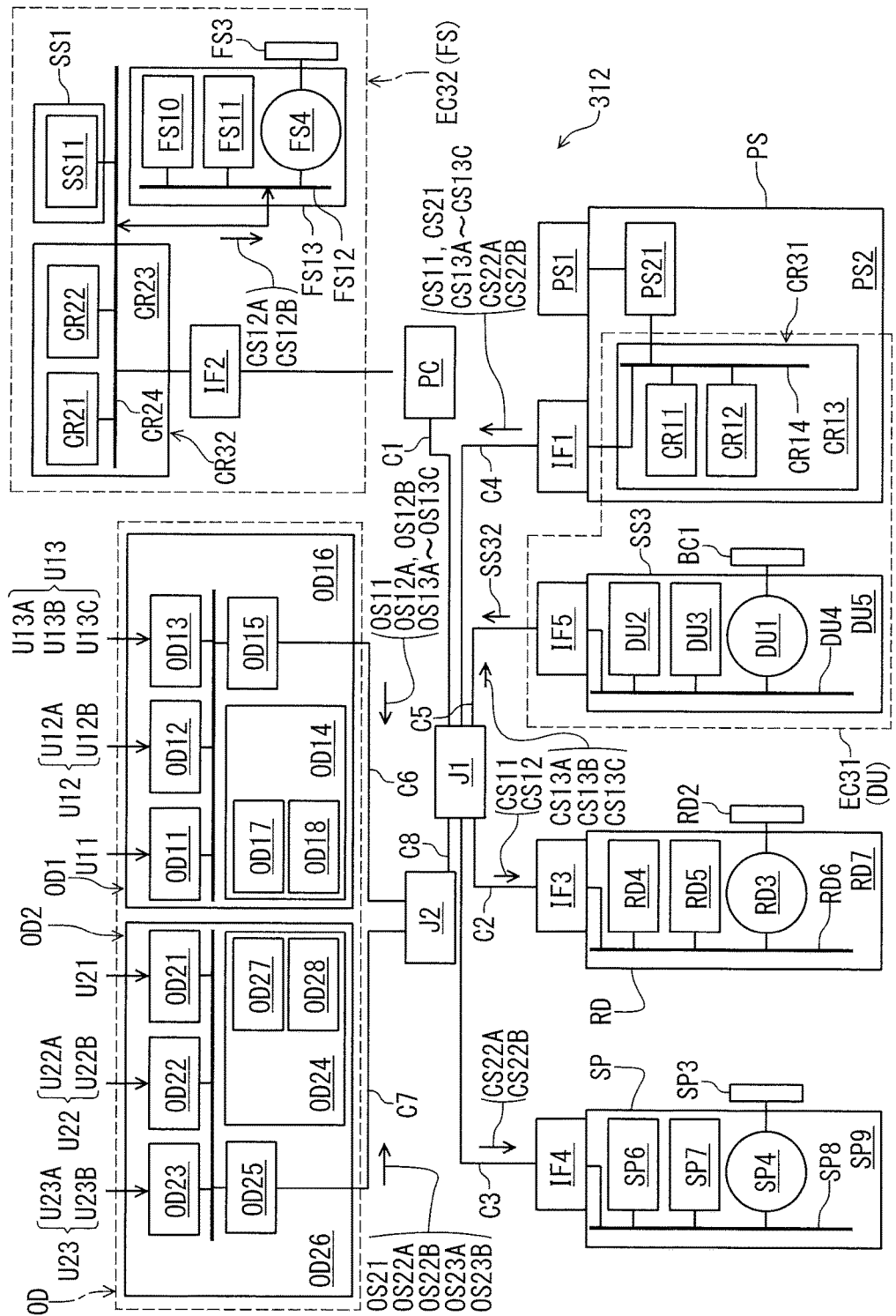
FIG. 9 is a block diagram of a bicycle electric system in accordance with a third embodiment.

As seen in FIG. 9, the bicycle electric system 312 comprises a first electric component EC31, a second electric component EC32, and a second controller CR32. The first electric component EC31 includes a first controller CR31 and a sensor SS3. The second electric component EC32 is different from the first electric component EC31. The second electric component EC32 is separately provided from the first electric component EC31. At least one of the first electric component EC31 and the second electric component EC32 includes the electric suspension FS. In this embodiment, the first electric component EC1 includes the electric drive unit DU to generate the auxiliary drive force. The sensor SS3 includes the torque sensor DU2. The second electric component EC32 includes the electric suspension FS. The electric suspension FS has the unlocked state and the locked state.

The first controller CR31 has substantially the same configuration as that of the first controller CR1 of the first embodiment. The second controller CR32 has substantially the same configuration as that of the second controller CR2 of the first embodiment. The first controller CR31 is configured to control an operating status of the first electric component EC31 based on an output S32 of the sensor SS3. The second controller CR32 is configured to control an operating status of the second electric component EC32 based on the output SS32 of the sensor SS3 of the first electric component EC31.

The bicycle electric system 312 further comprises a protocol converter PC3. The protocol converter PC3 is electrically connectable to the first electric component EC31 and the second controller CR32 to convert one of the first communication protocol and the second communication protocol to the other of the first communication protocol and the second communication protocol. In this embodiment, the protocol converter PC3 is electrically connected to the first electric component EC31 and the second controller CR32 with the electric communication path CP to convert the second communication protocol to the first communication protocol. However, the protocol converter PC3 can be omitted from the bicycle electric system 312 in a case where the second communication protocol is the same as the first communication protocol.

The automatic mode of the second controller CR32 will be described in detail below referring to FIG. 10.

Figure 10:
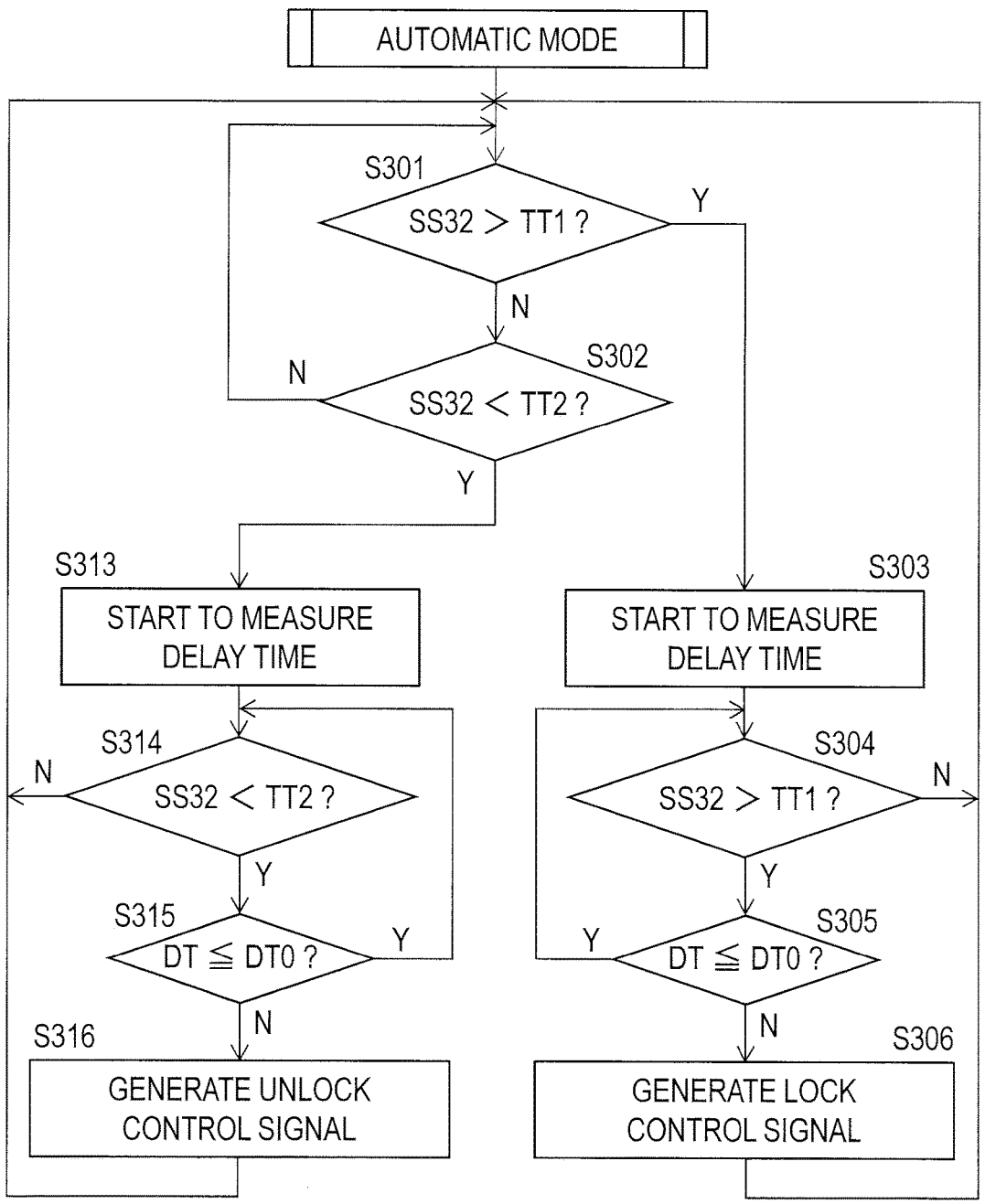
FIG. 10 is a flow chart of controlling of the bicycle electric system illustrated in FIG. 9.

As seen in FIG. 10, the second controller CR2 is configured to control the electric suspension FS to be in the unlocked state in a case where the second controller CR32 concludes that the output SS32 of the torque sensor DU2 is lower than a torque threshold TT1.

In this embodiment, the second controller CR32 determines if the output SS32 of the torque sensor DU2 keeps larger than the torque threshold TT1 during the reference delay time DT0. Specifically, the second controller CR32 starts to measure the delay time DT when the second controller CR32 concludes that the output SS32 of the torque sensor DU2 is larger than the torque threshold TT1 (steps S301 and S303). After the step S303, the second controller CR32 determines if the output SS32 of the torque sensor DU2 is larger than the torque threshold TT1 (step S304). The process returns to the step S301 when the second controller CR32 concludes that the output SS32 of the torque sensor DU2 is larger than the torque threshold TT1 (step S304).

When the second controller CR32 concludes that the output SS32 of the torque sensor DU2 is larger than the torque threshold TT1, the second controller CR32 determines if the delay time DT is equal to or shorter than the reference delay time DT0 (steps S304 and S305). When the second controller CR32 concludes that the delay time DT is equal to or shorter than the reference delay time DT0, the steps S304 and S305 are repeatedly executed.

When the delay time DT is longer than the reference delay time DT0, the second controller CR32 generates the lock control signal CS12B (step S305 and S306). In response to the lock control signal CS12B, the actuator driver FS11 controls the first electric actuator FS4 to change the state of the valve structure FS3 to the locked state. After the step S306, the process returns to the step S301.

As seen in FIG. 10, the second controller CR2 is configured to control the electric suspension FS to be in the locked state in a case where the second controller concludes that an output of the torque sensor DU2 is smaller than a torque threshold TT2. In this embodiment, the torque threshold TT1 is different from the torque threshold TT2. The torque threshold TT1 is larger than the acceleration threshold TT2. However, the torque threshold TT1 can be equal to or smaller than the torque threshold TT2.

In this embodiment, the second controller CR32 determines if the output SS32 of the torque sensor DU2 keeps smaller than the torque threshold TT2 during the reference delay time DT0. Specifically, the second controller CR32 starts to measure the delay time DT when the second controller CR32 concludes that the output SS32 of the torque sensor DU2 is smaller than the torque threshold TT2 (steps S302 and S313). After the step S313, the second controller CR32 determines if the output SS32 of the torque sensor DU2 is smaller than the torque threshold TT2 (step S314). The process returns to the step S301 when the second controller CR32 concludes that the output SS32 of the torque sensor DU2 is equal to or larger than the torque threshold TT2 (step S314).

When the second controller CR32 concludes that the output SS32 of the torque sensor DU2 is smaller than the torque threshold TT2, the second controller CR32 determines if the delay time DT is equal to or shorter than the reference delay time DT0 (steps S314 and S315). When the second controller CR32 concludes that the delay time DT is equal to or shorter than the reference delay time DT0, the steps S314 and S315 are repeatedly executed.

When the delay time DT is longer than the reference delay time DT0, the second controller CR32 generates the lock control signal CS12B (step S315 and S316). In response to the unlock control signal CS12A, the actuator driver FS11 controls the first electric actuator FS4 to change the state of the valve structure FS3 to the unlocked state. After the step S316, the process returns to the step S301.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle electric system comprising:
   a first electric component including a first controller and a sensor, the first controller being configured to control an operating status of the first electric component based on an output of the sensor;
   a second electric component different from the first electric component, at least one of the first electric component and the second electric component includes an electric suspension; and
   a second controller configured to control an operating status of the second electric component based on the output of the sensor of the first electric component.

2. The bicycle electric system according to claim 1, wherein
   the first electric component includes the electric suspension.

3. The bicycle electric system according to claim 1, wherein
   the second electric component includes at least one of an electric shifting device and an electric adjustable seatpost.

4. The bicycle electric system according to claim 1, further comprising
   a power supply electrically connectable to the first electric component and the second electric component to supply electricity to the first electric component and the second electric component.

5. The bicycle electric system according to claim 1, wherein
   the first electric component includes a first interface configured to communicate using a first communication protocol, and
   the second controller includes a second interface electrically connectable to the second electric component to communicate with the second electric component using a second communication protocol different from the first communication protocol.

6. The bicycle electric system according to claim 5, further comprising
   a protocol converter electrically connectable to the first electric component and the second controller to convert one of the first communication protocol and the second communication protocol to the other of the first communication protocol and the second communication protocol.

7. The bicycle electric system according to claim 1, wherein
   the second controller is electrically connectable to the first electric component with an electric cable to communicate with the first electric component through the electric cable.

8. The bicycle electric system according to claim 1, wherein
   the second controller is electrically connectable to the first electric component with a wireless communication path to communicate wirelessly with the first electric component through the wireless communication path.

9. The bicycle electric system according to claim 1, wherein
   the sensor includes an acceleration sensor.

10. The bicycle electric system according to claim 9, wherein
    the second electric component includes an electric shifting device, and
    the second controller is configured to control the electric shifting device to downshift in a case where the second controller concludes that an output of the acceleration sensor is larger than an acceleration threshold.

11. The bicycle electric system according to claim 9, wherein
  the second electric component includes an electric shifting device, and
  the second controller is configured to control the electric shifting device to upshift in a case where the second controller concludes that an output of the acceleration sensor is smaller than an acceleration threshold.

12. The bicycle electric system according to claim 9, wherein
  the second electric component includes an electric adjustable seatpost, and
  the second controller is configured to control the electric adjustable seatpost to shorten the electric adjustable seatpost in a case where the second controller concludes that an output of the acceleration sensor is larger than an acceleration threshold.

13. The bicycle electric system according to claim 9, wherein
  the second electric component includes an electric adjustable seatpost, and
  the second controller is configured to control the electric adjustable seatpost to lengthen the electric adjustable seatpost in a case where the second controller concludes that an output of the acceleration sensor is smaller than an acceleration threshold.

14. The bicycle electric system according to claim 1, wherein
  the first electric component includes an electric drive unit to generate an auxiliary drive force, the sensor including a torque sensor, and
  the second electric component includes the electric suspension.

15. The bicycle electric system according to claim 14, wherein
  the second electric component includes the electric suspension having an unlocked state and a locked state, and
  the second controller is configured to control the electric suspension to be in the unlocked state in a case where the second controller concludes that an output of the torque sensor is lower than a torque threshold.

16. The bicycle electric system according to claim 14, wherein
  the second electric component includes the electric suspension having an unlocked state and a locked state, and
  the second controller is configured to control the electric suspension to be in the locked state in a case where the second controller concludes that an output of the torque sensor is higher than a torque threshold.

17. The bicycle electric system according to claim 1, wherein
  the first electric component includes the electric suspension; and
  the second electric component includes an electric shifting device.

18. The bicycle electric system according to claim 1, wherein
  the first electric component includes the electric suspension; and
  the second electric component includes an electric adjustable seatpost.

19. A bicycle electric system comprising:
  an electric component different from an electric suspension; and
  a controller configured to control an operating status of the electric component based on an output of a sensor of the electric suspension, the electric component includes at least one of an electric shifting device and an electric adjustable seatpost.

* * * * *